US012715160B2

(12) United States Patent
Sonderegger et al.

(10) Patent No.: US 12,715,160 B2
(45) Date of Patent: Aug. 25, 2026

(54) MACHINING SEGMENT FOR A MACHINING TOOL

(71) Applicant: Hilti Aktiengesellschaft, Schaan (LI)

(72) Inventors: Marcel Sonderegger, Balgach (CH); Cliff Toldo, Vaduz (LI); Matthias Lodes, Altendorf (CH); Stephan Huth, Memmingerberg (DE)

(73) Assignee: Hilti Aktiengesellschaft, Schaan (LI)

( * ) Notice: Subject to any disclaimer, the term of this patent is extended or adjusted under 35 U.S.C. 154(b) by 716 days.

(21) Appl. No.: 17/415,291

(22) PCT Filed: Dec. 20, 2019

(86) PCT No.: PCT/EP2019/025468
§ 371 (c)(1),
(2) Date: Jun. 17, 2021

(87) PCT Pub. No.: WO2020/126091
PCT Pub. Date: Jun. 25, 2020

(65) Prior Publication Data

US 2022/0055183 A1 Feb. 24, 2022

(30) Foreign Application Priority Data

Dec. 21, 2018 (EP) .................................... 18215310

(51) Int. Cl.
*B28D 1/04* (2006.01)
*B24D 5/06* (2006.01)

(52) U.S. Cl.
CPC ............... *B28D 1/041* (2013.01); *B24D 5/06* (2013.01)

(58) Field of Classification Search
CPC .......... B24D 5/06; B24D 5/063; B24D 5/123; B24D 7/06; B24D 7/063; B24D 7/066;
(Continued)

(56) References Cited

U.S. PATENT DOCUMENTS 3,343,308 A * 9/1967 Fessel .................... B28D 1/041 125/21
3,898,772 A * 8/1975 Sawluk .................... B24D 5/06 451/547
(Continued)

FOREIGN PATENT DOCUMENTS

CN 205200700 U 5/2016
EP 0 633 087 A1 1/1995
(Continued)

OTHER PUBLICATIONS

Inovatec Machinery, Mesh size, Jul. 2, 2020, section 3 published from ISO 565-1990 year 1990 (Year: 1990).*
(Continued)

*Primary Examiner* — Robert F Neibaur
(74) *Attorney, Agent, or Firm* — Crowell & Moring LLP

(57) ABSTRACT

A machining segment for a machining tool which is rotatable in a direction of rotation about an axis of rotation includes an underside where the machining segment is connectable to a basic body of the machining tool by the underside. A machining zone has a matrix material and a plurality of first hard material particles where the plurality of first hard material particles are disposed in the matrix material in accordance with a defined particle pattern. Each of the plurality of first hard material particles has a respective projection in relation to the matrix material on an upper side of the machining segment. The projection of at least one of the plurality of first hard material particles is greater than 400 μm.

12 Claims, 4 Drawing Sheets

(58) Field of Classification Search

CPC ...... B24D 2203/00; B24D 99/05; B24D 3/06; B28D 1/041

USPC ....... 451/548, 541, 542, 544, 547, 543, 540, 451/359, 464; 125/22

See application file for complete search history.

(56) References Cited

U.S. PATENT DOCUMENTS

| | | | | |
|---|---|---|---|---|
| 5,544,643 A | | 8/1996 | Bauer et al. | |
| 6,106,382 A | * | 8/2000 | Sakaguchi | B24D 3/06 451/443 |
| 6,626,167 B2 | * | 9/2003 | Kim | B24D 18/00 451/540 |
| 7,337,775 B2 | * | 3/2008 | Kim | B28D 1/041 451/542 |
| 9,446,503 B2 | * | 9/2016 | Pearce | C22C 26/00 |
| 2003/0186636 A1 | * | 10/2003 | Akyuz | B28D 1/121 451/541 |
| 2014/0308883 A1 | * | 10/2014 | Sung | B24B 53/017 451/443 |
| 2016/0129555 A1 | * | 5/2016 | Bilen | E21B 10/46 175/428 |

FOREIGN PATENT DOCUMENTS

| | | |
|---|---|---|
| EP | 2 745 965 A1 | 6/2014 |
| EP | 2 745 966 A1 | 6/2014 |
| JP | 6-126728 A | 5/1994 |

OTHER PUBLICATIONS

PCT/EP2019/025468, International Search Report dated Mar. 10, 2020 (Three (3) pages).

Chen et al., "An experimental study on the grinding of alumina with a monolayer brazed diamond wheel",, *The International Journal of Advanced Manufacturing Technology*, Springer, Berlin, DE, vol. 41, No. 1-2, Jun. 4, 2008, pp. 16-23, XP019700455.

Wang et al, "Interfacial microstructure and performance of brazed diamond grits with Ni—Cr—P alloy", *Journal of Alloys and Compounds, Elsevier Sequoia*, Lausanne, Ch, vol. 476, No. 1-2, May 12, 2009, pp. 884-888, XP026044895.

Zhan et al., "An experimental investigation of temperatures and energy partition in grinding of cemented carbide with a brazed diamond wheel", *The International Journal of Advanced Manufacturing Technology*, Springer, Berlin, DE, vol. 61, No. 1-4, Nov. 11, 2011, pp. 117-125, XP035073582.

U.S. Patent Application, "Method for Producing a Machining Segment for the Dry Machining of Concrete Materials", filed Jun. 17, 2021, first named inventor Marcel Sonderegger.

U.S. Patent Application, "Machining Segment for the Dry Machining of Concrete Materials", filed Jun. 17, 2021, first named inventor Marcel Sonderegger.

U.S. Patent Application, "Method for Producing a Green Body and Method for Further Processing the Green Body Into a Machining Segment for the Dry Machining of Concrete Materials", filed Jun. 17, 2021, first named inventor Marcel Sonderegger.

* cited by examiner

MACHINING SEGMENT FOR A MACHINING TOOL

BACKGROUND AND SUMMARY OF THE INVENTION

The present invention relates to a machining segment for a machining tool and to a machining tool with such a machining segment.

Machining tools, such as core drill bits, saw blades, abrasive disks and cut-off grinding chains, comprise machining segments that are attached to a tubular, disk-shaped or annular basic body, wherein the machining segments are connected to the basic body by welding, soldering or adhesive bonding. Depending on the machining method of the machining tool, machining segments that are used for core drilling are referred to as drilling segments, machining segments that are used for sawing are referred to as sawing segments, machining segments that are used for abrasive removal are referred to as abrading segments and machining segments that are used for cut-off grinding are referred to as cut-off grinding segments.

Machining segments for core drill bits, saw blades, abrasive disks and cut-off grinding chains are produced from a matrix material and hard material particles, where the hard material particles can be randomly distributed or arranged according to a defined particle pattern in the matrix material. In the case of machining segments with randomly distributed hard material particles, the matrix material and the hard material particles are mixed and the mixture is poured into a suitable mold and further processed to form the machining segment. In the case of machining segments with set hard material particles, a green body is built up in layers from matrix material, in which the hard material particles are placed according to the defined particle pattern. In the case of machining segments that are welded to the basic body of the machining tool, the structure comprising a machining zone and a neutral zone has proven to be successful. The machining zone is built up from a first matrix material and the neutral zone is built up from a second matrix material, which is different from the first matrix material.

Machining tools that are designed as a core drill bit, saw blade, abrasive disk or cut-off grinding chain and are intended for the wet machining of concrete materials are only suitable to a limited extent for the dry machining of concrete materials. In the wet machining of concrete materials, an abrasive concrete sludge is produced, which is conducive to the machining process and leads to a self-sharpening of the machining segments during the machining. The matrix material is removed by the abrasive drilling sludge and new hard material particles are exposed. In the dry machining of concrete materials, no abrasive drilling sludge that could be conducive to the drilling process can form. The hard material particles quickly become dull and the machining rate drops. Due to the lack of concrete sludge, the matrix material wears too slowly and deeper-lying hard material particles cannot be exposed. In the case of known machining tools for wet machining, the matrix material and the hard material particles have similar rates of wear.

The object of the present invention is to develop a machining segment for a machining tool that allows dry machining of concrete materials, wherein the machining segment is intended to have a high machining rate and as long a service life as possible.

According to the invention, the machining segment is characterized in that, on the upper side, at least one of the first hard material particles has a projection which is greater than 400 μm in relation to the first matrix material. “First hard material particles” refer to the hard material particles of the machining segment according to the invention that, on the upper side, have a projection in relation to the first matrix material; hard material particles which are completely embedded in the first matrix material in the finished machining segment are not included in the definition of the first hard material particles.

A machining segment in which at least one of the first hard material particles has a projection of more than 400 μm in relation to the first matrix material is suitable for the dry machining of concrete materials. The greater the projection of the first hard material particles, the higher the machining rate that can be achieved with the machining segment.

A plurality of first hard material particles preferably have a projection which is greater than 400 μm in relation to the first matrix material. The greater the number of first hard material particles that have a projection of more than 400 μm, the higher is the machining rate of the machining tool during the dry machining of concrete materials.

All of the first hard material particles preferably have a projection which is greater than 400 μm in relation to the first matrix material. The greater the number of first hard material particles that have a projection of more than 400 μm, the higher is the machining rate of the machining tool during the dry machining of concrete materials.

The first hard material particles preferably have an embedding depth which is greater than 400 μm. A concrete material is machined with by means of the first hard material particles which are embedded in the first matrix material. The service life of a machining segment depends, inter alia, on whether the first hard material particles are securely attached in the first matrix material. At an embedding depth of the first hard material particles of more than 400 μm, the first hard material particles are securely attached in the first matrix material. The greater the embedding depth of the first hard material particles in the first matrix material, the better the first hard material particles are attached in the first matrix material.

In a preferred variant, the projection of the first hard material particles of at least 400 μm in relation to the first matrix material is provided in a front-side region of the first hard material particles, as viewed in the direction of rotation of the machining tool. Concrete materials are machined with a machining segment according to the invention in the front-side region of the first hard material particles, as viewed in the direction of rotation. In order to obtain a high machining rate, the first hard material particles should have the projection of more than 400 μm in relation to the first matrix material in the front-side region.

A front-side projection of the first hard material particles in the front-side region of the first hard material particles preferably differs from a rear-side region of the first hard material particles, as viewed in the direction of rotation of the machining tool. Concrete materials are machined with a machining segment according to the invention in the front-side region of the first hard material particles, as viewed in the direction of rotation. Since the rear-side region of the first hard material particles, as viewed in the direction of rotation, has only a small influence on the machining rate, the projection of the first hard material particles in the front-side region and in the rear-side region may be different.

The rear-side projection of the first hard material particles in the rear-side region of the first hard material particles is particularly preferably smaller than 400 μm. Since concrete materials are machined with a machining segment according to the invention in the front-side region of the first hard material particles, the rear-side projection of the first hard material particles can be undertaken in respect of securely attaching the first hard material particles in the first matrix material.

In a further development of the machining segment, second hard material particles are arranged in the first matrix material, wherein an average particle diameter of the second hard material particles is less than an average particle diameter of the first hard material particles. Depending on the wear properties of the first matrix material, increased wear of the first matrix material on the side surfaces of the machining segment can occur during the machining of a concrete material with the machining tool as a result of friction with the base material (e.g., drill hole or sawing slit). The wear of the first matrix material can be reduced by second hard material particles. The second hard material particles can be admixed with the first matrix material as randomly distributed particles, or the second hard material particles are placed in the first matrix material according to a defined second particle pattern. The second hard material particles are placed in particular in the region of the side surfaces of the machining segment.

The invention also relates to a machining tool comprising a basic body and at least one machining segment according to the invention that is connected by an underside to the basic body of the machining tool. A machining tool with at least one machining segment in which at least one of the first hard material particles has a projection of more than 400 μm in relation to the first matrix material is suitable for the dry machining of concrete materials. The greater the projection of the first hard material particles, the higher the machining rate that can be achieved with the machining tool.

In a first preferred variant, the machining tool takes the form of a core drill bit with a tubular basic body and a number of machining segments.

In a second preferred variant, the machining tool takes the form of a core drill bit with a tubular basic body and an annular machining segment.

In a third preferred variant, the machining tool takes the form of an annular or disk-shaped saw blade with an annular or disk-shaped basic body and a number of machining segments.

In a fourth preferred variant, the machining tool takes the form of an abrasive disk with a basic body and a number of machining segments.

Exemplary embodiments of the invention are described hereinafter with reference to the drawings. This is not necessarily to show the exemplary embodiments to scale; rather the drawings, where useful for explanation, are produced in a schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, the same reference numerals are used below for identical or similar parts or parts with identical or similar functions.

DETAILED DESCRIPTION OF THE DRAWINGS

Figure 1A:
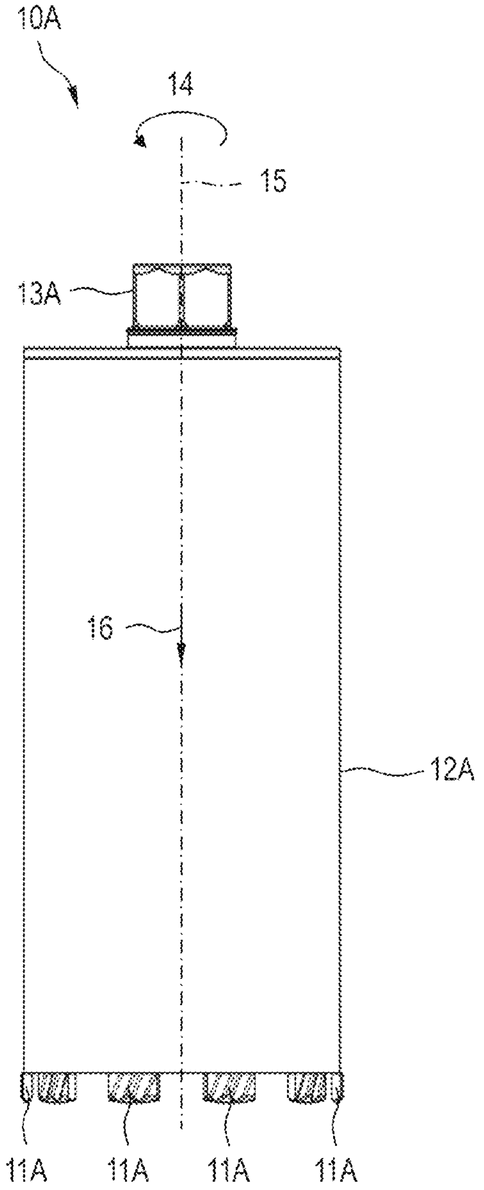
FIGS. 1A, 1B show two variants of a machining tool taking the form of a core drill bit.
Figure 1B:
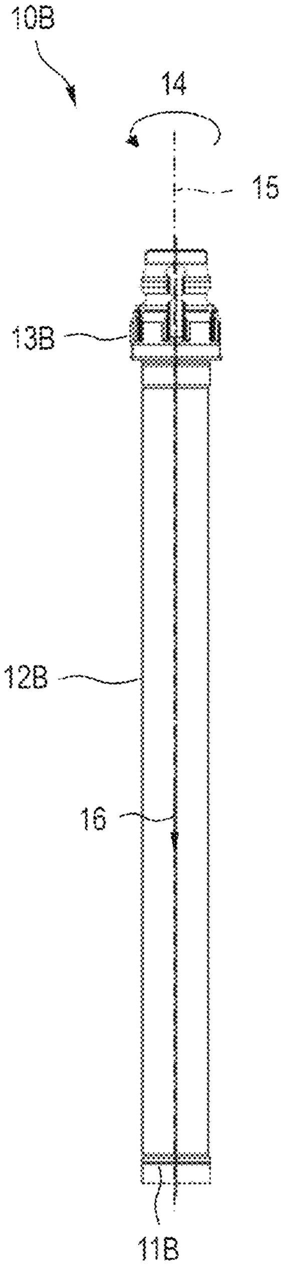

FIGS. 1A, 1B show two variants of a machining tool taking the form of a core drill bit 10A, 10B. The core drill bit 10A shown in FIG. 1A is referred to below as the first core drill bit, and the core drill bit 10B shown in FIG. 1B is referred to as the second core drill bit; in addition, the first and second core drill bits 10A, 10B are both included under the term "core drill bit".

The first core drill bit 10A comprises a number of machining segments 11A, a tubular basic body 12A and a tool fitting 13A. The machining segments 11A, which are used for core drilling, are also referred to as drilling segments and the tubular basic body 12A is also referred to as a drilling shaft. The drilling segments 11A are fixedly connected to the drilling shaft 12A, for example by screwing, adhesive bonding, brazing or welding.

The second core drill bit 10B comprises an annular machining segment 11B, a tubular basic body 12B and a tool fitting 13B. The annular machining segment 11B, which is used for core drilling, is also referred to as a drilling ring, and the tubular basic body 12B is also referred to as a drilling shaft. The drilling ring 11B is fixedly connected to the drilling shaft 12B, for example by screwing, adhesive bonding, brazing or welding.

The core drill bit 10A, 10B is connected via the tool fitting 13A, 13B to a core drill and, in drilling operation, is driven by the core drill in a direction of rotation 14 about an axis of rotation 15. During the rotation of the core drill bit 10A, 10B about the axis of rotation 15, the core drill bit 10A, 10B is moved along a feed direction 16 into a workpiece to be machined, with the feed direction 16 running parallel to the axis of rotation 15. The core drill bit 10A, 10B creates a drill core and a borehole in the workpiece to be machined.

The drilling shaft 12A, 12B in the exemplary embodiment of FIGS. 1A, 1B is formed in one piece and the drilling segments 11A and the drilling ring 11B are fixedly connected to the drilling shaft 12A, 12B. Alternatively, the drilling shaft 12A, 12B may be of a two-piece form, composed of a first drilling shaft section and a second drilling shaft section, with the drilling segments 11A or the drilling ring 11B being fixedly connected to the first drilling shaft section, and the tool fitting 13A, 13B being fixedly connected to the second drilling shaft section. The first and second drilling shaft section are connected to one another via a releasable connection device. The releasable connection device takes the form for example of a plug-and-twist connection as described in EP 2 745 965 A1 or EP 2 745 966 A1. The formation of the drilling shaft as a one-piece or two-piece drilling shaft has no influence on the structure of the drilling segments 11A or of the drilling ring 11B.

Figure 2A:
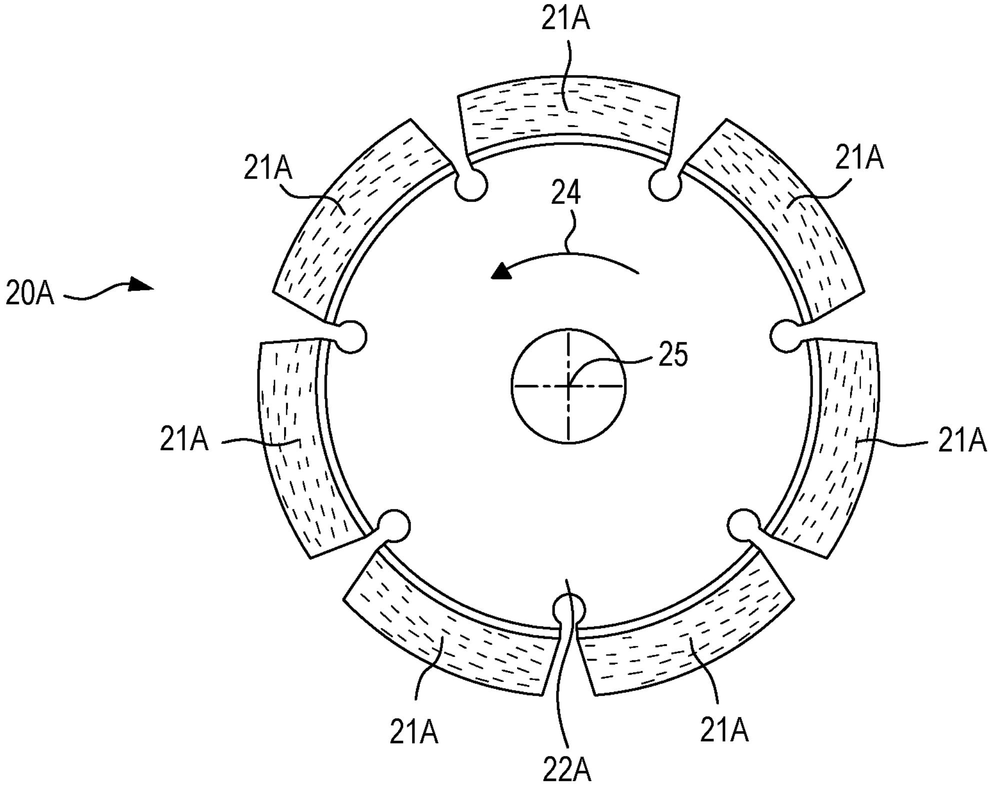
FIGS. 2A, 2B show two variants of a machining tool taking the form of a saw blade.
Figure 2B:
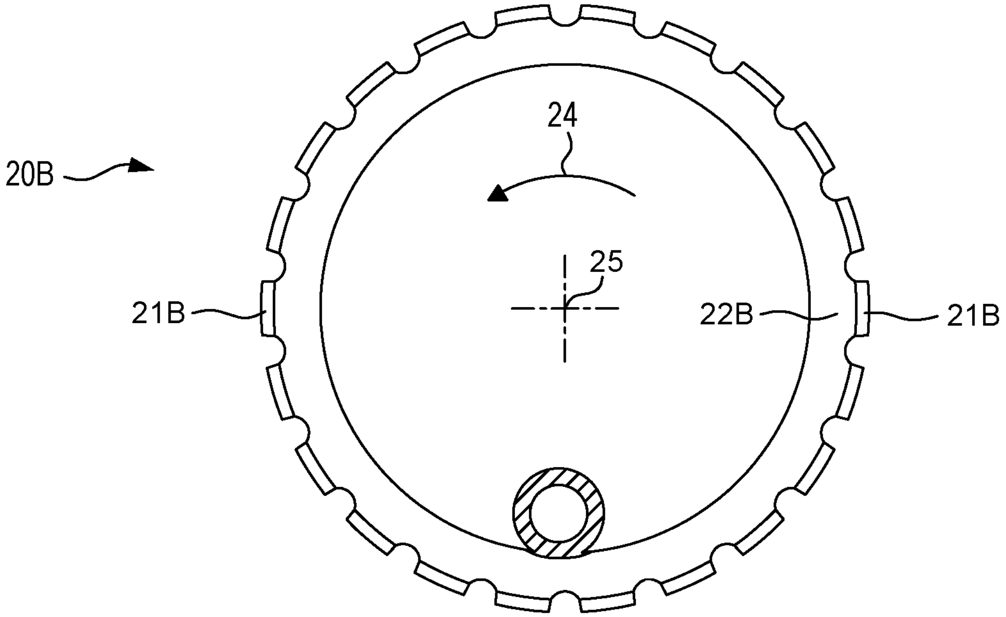

FIGS. 2A, 2B show two variants of a machining tool taking the form of a saw blade 20A, 20B. The saw blade 20A shown in FIG. 2A is referred to below as the first saw blade and the saw blade 20B shown in FIG. 2B is referred to as the second saw blade; in addition, the first and second saw blades 20A, 20B are both included under the term "saw blade".

The first saw blade 20A comprises a number of machining segments 21A, a disk-shaped basic body 22A and a tool fitting. The machining segments 21A, which are used for sawing, are also referred to as sawing segments, and the disk-shaped basic body 22A is also referred to as a blade body. The sawing segments 21A are fixedly connected to the blade body 22A, for example by screwing, adhesive bonding, brazing or welding.

The second saw blade 20B comprises a number of machining segments 21B, an annular basic body 22B and a tool fitting. The machining segments 21B, which are used for sawing, are also referred to as sawing segments and the annular basic body 22B is also referred to as a ring. The sawing segments 21B are fixedly connected to the ring 22B, for example by screwing, adhesive bonding, brazing or welding.

The saw blade 20A, 20B is connected to a saw via the tool fitting and, in sawing operation, is driven by the saw in a direction of rotation 24 about an axis of rotation 25. During the rotation of the saw blade 20A, 20B about the axis of rotation 25, the saw blade 20A, 20B is moved along a feed direction, the feed direction running parallel to the longitudinal plane of the saw blade 20A, 20B. The saw blade 20A, 20B creates a sawing slit in the workpiece to be machined.

Figure 3:
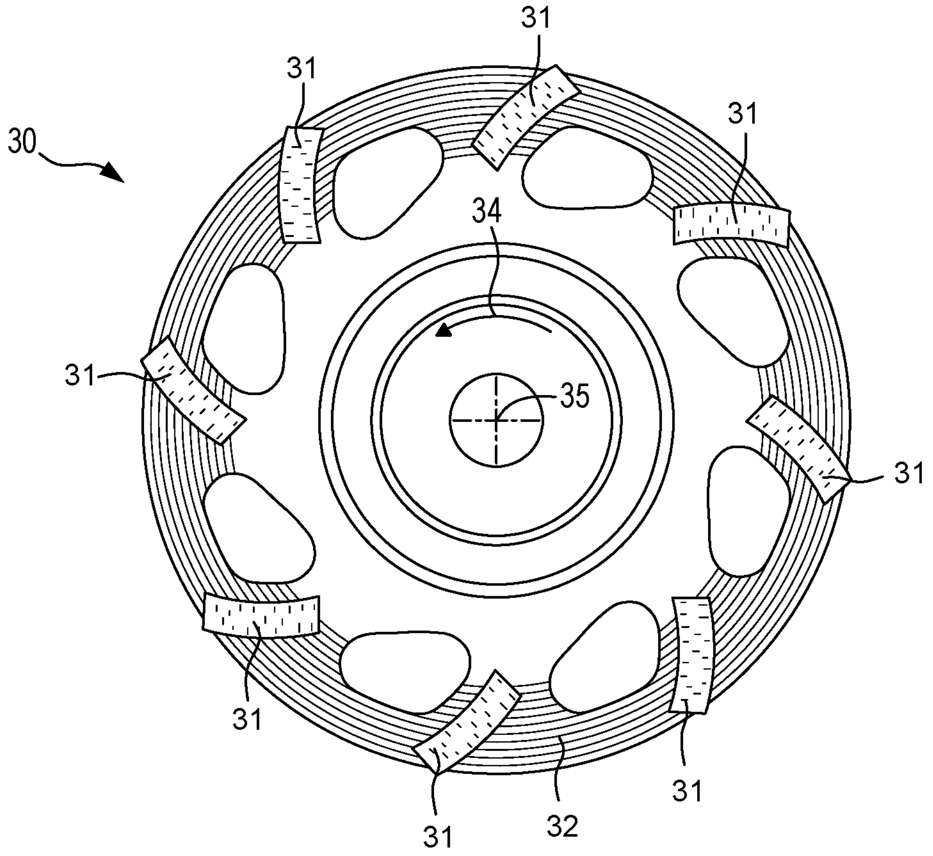
FIG. 3 shows a machining tool taking the form of an abrasive disk.

FIG. 3 shows a machining tool taking the form of an abrasive disk 30. The abrasive disk 30 comprises a number of machining segments 31, a basic body 32 and a tool fitting. The machining segments 31, which are used for abrasive removal, are also referred to as abrading segments, and the disk-shaped basic body 32 is also referred to as a pot. The abrading segments 31 are fixedly connected to the pot 32, for example by screwing, adhesive bonding, brazing or welding.

The abrasive disk 30 is connected via the tool fitting to a tool device and, in abrading operation, is driven by the tool device in a direction of rotation 34 about an axis of rotation 35. During the rotation of the abrasive disk 30 about the axis of rotation 35, the abrasive disk 30 is moved over a workpiece to be machined, the movement running perpendicular to the axis of rotation 35. The abrasive disk 30 removes the surface of the workpiece to be machined.

Figure 4:
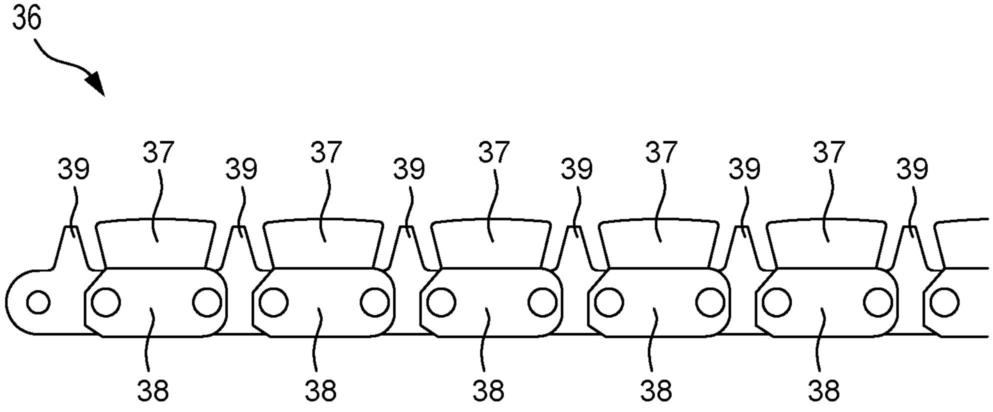
FIG. 4 shows a machining tool taking the form of a cut-off grinding chain.

FIG. 4 shows a machining tool taking the form of a cut-off grinding chain 36. The cut-off grinding chain 36 comprises a number of machining segments 37, a number of basic bodies 38 in the form of links, and a number of connecting links 39. The machining segments 37, which are used for cut-off grinding are also referred to as cut-off grinding segments, and the basic bodies 38 in the form of links are also referred to as driving links.

The driving links 38 are connected via the connecting links 39. In the exemplary embodiment, the connecting links 39 are connected to the driving links 38 via rivet bolts. The rivet bolts allow a rotation of the driving links 38 relative to the connecting links 39 about an axis of rotation which runs through the center of the rivet bolts. The machining segments 37 are fixedly connected to the driving links 38, for example by screwing, adhesive bonding, brazing or welding.

The cut-off grinding chain 36 is connected via a tool fitting to a tool device and, in operation, is driven by the tool device in a direction of rotation. During the rotation of the cut-off grinding chain 36, the cut-off grinding chain 36 is moved into a workpiece to be machined.

Figure 5A:
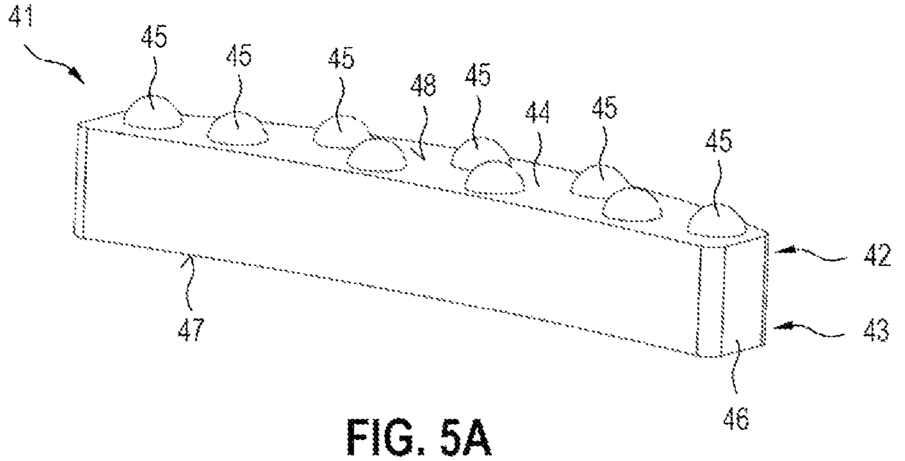
FIGS. 5A-C show a machining segment in a three-dimensional representation (FIG. 5A), in a view of an upper side (FIG. 5B), and in a view of a side surface (FIG. 5C).
Figure 5B:
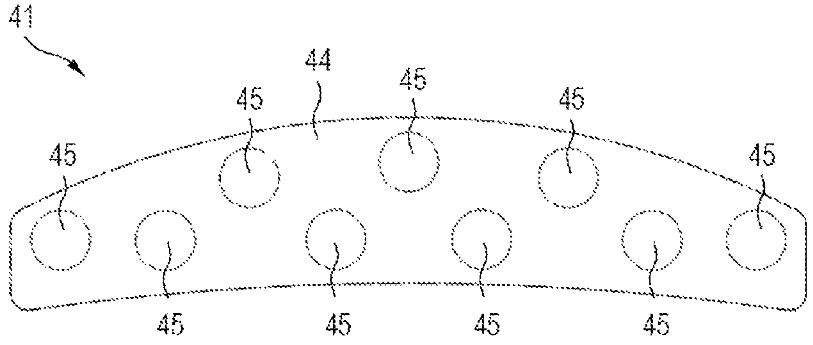
Figure 5C:
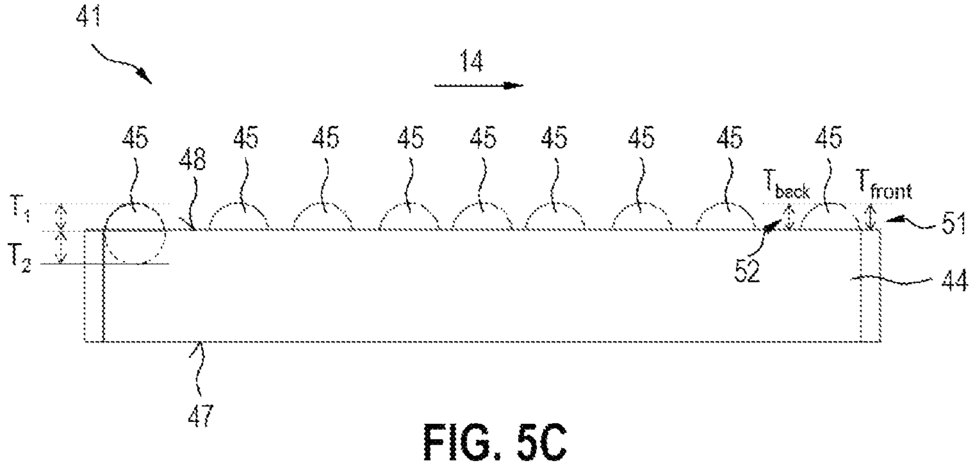

FIGS. 5A-C show a machining segment 41 according to the invention in a three-dimensional representation (FIG. 5A), in a view of an upper side of the machining segment 41 (FIG. 5B), and in a view of a side surface of the machining segment 41 (FIG. 5C).

The machining segment 41 corresponds in structure and composition to the machining segments 11A, 21A, 21B, 31, 37; the machining segment 11B taking the form of a drilling ring differs from the machining segment 41 by its annular structure. The machining segments can differ from one another in the dimensions and in the curvatures of the surfaces. The basic structure of the machining segments according to the invention is explained on the basis of the machining segment 41 and applies to the machining segments 11A, 11B of FIGS. 1A, 1B, to the machining segments 21A, 21B of FIGS. 2A, 2B, to the machining segment 31 of FIG. 3, and to the machining segment 37 of FIG. 4.

The machining segment 41 is built up from a machining zone 42 and a neutral zone 43. The neutral zone 43 is required if the machining segment 41 is intended to be connected to the basic body of a machining tool; in the case of machining segments which are connected to the basic body for example by brazing or adhesive bonding, the neutral zone 43 can be omitted. The machining zone 42 is built up from a first matrix material 44 and first hard material particles 45, and the neutral zone 43 is built up from a second matrix material 46 without hard material particles.

Machining segments according to the invention have a layer with first hard material particles 45; further layers with first hard material particles 45 are not provided. "First hard material particles" refer to those hard material particles of the machining segment 41 which, after the production of the machining segment 41, have on the upper side a projection in relation to the first matrix material 44. Hard material particles which are completely embedded in the first matrix material 44 in the finished machining segment do not come under the definition of the first hard material particles.

The machining segment 41 is connected by an underside 47 to the basic body of the machining tool. In the case of machining segments for core drilling and in the case of machining segments for abrasive removal, the underside of the machining segments is generally formed as planar, whereas the underside in the case of machining segments for sawing has a curvature in order to be able to fasten the machining segments to the curved end face of the annular or disk-shaped basic body.

The first hard material particles 45 are arranged in the first matrix material 44 according to a defined particle pattern (FIG. 5B) and have on an upper side 48, opposite from the underside 47, of the machining segment 41 a projection $T_1$ with respect to the first matrix material 44. In the exemplary embodiment of FIGS. 5A-C, the machining segment 41 comprises a number of 9 first hard material particles 45 which project on the upper side 48. The number of the first hard material particles 45 and the defined particle pattern in which the first hard material particles 45 are arranged in the first matrix material 44 are adapted to the requirements of the machining segment 41. The first hard material particles 45 generally derive from a particle distribution which is characterized by a minimum diameter, a maximum diameter and an average diameter.

On account of the particle distribution of the first hard material particles 45 between the minimum and maximum diameter, the projections of the first hard material particles 45 can vary correspondingly. In the exemplary embodiment, all first hard material particles 45 have a projection of more than 400 μm with respect to the surrounding first matrix material 44.

The machining tools according to the invention that are shown in FIGS. 1A, 1B, FIGS. 2A, 2B, FIG. 3 and FIG. 4 and are intended for the machining of concrete materials have a defined direction of rotation. When considered in the direction of rotation of the machining tool, a distinction can be drawn between a front-side region and a rear-side region of a hard material particle 45. On account of its geometry with a planar underside, the machining segment 41 is suitable as a drilling segment for the core drill bit 10A.

The direction of rotation 14 of the core drill bit 10A defines a front-side region 51 and a rear-side region 52. The machining of concrete materials occurs in the front-side regions 51 of the first hard material particles 45, and the machining rate essentially depends on the size of the projection of the first hard material particles in the front-side regions 51. The first hard material particles 45 have in the front-side region 51 a front-side projection $T_{front}$ and in the rear-side region a rear-side projection $T_{back}$, which correspond in the exemplary embodiment. Alternatively, the first hard material particles 45 may have different front-side projections $T_{front}$ and rear-side projections $T_{back}$.

The machining segment 41 can be produced, for example, in a three-stage process: In a first stage, a green body is built up from the first matrix material 44 and the first hard material particles 45; in a second stage, the green body is compacted to form a compact body and, in a third stage, the compact body is further processed to form a machining segment. The green body is compacted in the second stage under the action of pressure until the compact body has substantially the final geometry of the machining segment. Examples of suitable methods for achieving an action of pressure on the green body are cold-pressing methods or hot-pressing methods. In the case of cold-pressing methods, the green body is exclusively subjected to an action of pressure, while in the case of hot-pressing methods the green body is subjected not only to the action of pressure but also to an action of temperature up to temperatures of about 200° C. The compact body is further processed under the action of temperature by sintering to form the machining segment.

What is claimed is:

1. A machining segment for a machining tool which is rotatable in a direction of rotation about an axis of rotation, comprising:

an underside, wherein the machining segment is connectable to a basic body of the machining tool by the underside; and a machining zone comprising a matrix material and a plurality of first hard material particles, wherein the plurality of first hard material particles are disposed in the matrix material in accordance with a defined particle pattern such that the first hard material particles are arranged in a first layer of the matrix material and the matrix material includes no other such hard material particles, wherein each of the plurality of first hard material particles has a respective projection in relation to the matrix material on an upper side of the machining segment, wherein the upper side is opposite the underside, wherein the projection of at least one of the plurality of first hard material particles is greater than 400 μm, and wherein each of the plurality of first hard material particles has a respective embedding depth which is greater than 400 μm.

2. The machining segment as claimed in claim 1, wherein the projection of at least two of the plurality of first hard material particles is greater than 400 μm.

3. The machining segment as claimed in claim 1, wherein the projection of all of the plurality of first hard material particles is greater than 400 μm.

4. The machining segment as claimed in claim 1, wherein the projection of the at least one of the plurality of first hard material particles that is greater than 400 μm is disposed in a front-side region of the at least one of the plurality of first hard material particles as viewed in the direction of rotation of the machining tool.

5. The machining segment as claimed in claim 1, wherein the respective projection is disposed in a front-side region of the respective first hard material particle and wherein a respective rear-side projection of a rear-side region of the respective first hard material particle differs from the projection of the front-side region as viewed in the direction of rotation of the machining tool.

6. The machining segment as claimed in claim 5, wherein the rear-side projection is smaller than 400 μm.

7. The machining segment as claimed in claim 1, wherein the machining zone further comprises a plurality of second hard material particles disposed in the matrix material and wherein an average particle diameter of the plurality of second hard material particles is less than an average particle diameter of the plurality of first hard material particles.

8. A machining tool, comprising:

a basic body; and a machining segment, wherein the machining segment comprises:

an underside, wherein the machining segment is connected to the basic body of the machining tool by the underside; and a machining zone comprising a matrix material and a plurality of first hard material particles, wherein the plurality of first hard material particles are disposed in the matrix material in accordance with a defined particle pattern such that the first hard material particles are arranged in a first layer of the matrix material and the matrix material includes no other such hard material particles, wherein each of the plurality of first hard material particles has a respective projection in relation to the matrix material on an upper side of the machining segment, wherein the upper side is opposite the underside, wherein the projection of at least one of the plurality of first hard material particles is greater than 400 μm, and wherein each of the plurality of first hard material particles has a respective embedding depth which is greater than 400 μm.

9. The machining tool as claimed in claim 8, wherein the machining tool is a core drill bit and wherein the basic body is a tubular basic body.

10. The machining tool as claimed in claim 8, wherein the machining tool is a core drill bit, wherein the basic body is a tubular basic body, and wherein the machining segment is an annular machining segment.

11. The machining tool as claimed in claim 8, wherein the machining tool is an annular or disk-shaped saw blade and wherein the basic body is an annular or disk-shaped basic body.

12. The machining tool as claimed in claim 8, wherein the machining tool is an abrasive disk.

* * * * *